US009491770B1

(12) United States Patent
Heninwolf

(10) Patent No.: US 9,491,770 B1
(45) Date of Patent: Nov. 8, 2016

(54) SYSTEM AND METHOD FOR AVOIDING INTERFERING SIGNALS

(71) Applicant: Google Inc., Mountain View, CA (US)

(72) Inventor: Paul Heninwolf, San Carlos, CA (US)

(73) Assignee: Google Inc., Mountain View, CA (US)

( * ) Notice: Subject to any disclaimer, the term of this patent is extended or adjusted under 35 U.S.C. 154(b) by 293 days.

(21) Appl. No.: 13/719,263

(22) Filed: Dec. 19, 2012

(51) Int. Cl.
*H04W 72/08* (2009.01)

(52) U.S. Cl.
CPC ................... *H04W 72/082* (2013.01)

(58) Field of Classification Search
CPC ....... H04B 3/464; H04J 3/10; H04W 72/082
USPC ................... 370/201, 202, 381, 379
See application file for complete search history.

(56) References Cited

U.S. PATENT DOCUMENTS

| | | | | |
|---|---|---|---|---|
| 6,711,380 | B1* | 3/2004 | Callaway, Jr. | 455/41.2 |
| 6,804,496 | B1* | 10/2004 | Carlson et al. | 455/67.15 |
| 7,215,659 | B1* | 5/2007 | Chen et al. | 370/338 |
| 7,990,933 | B2* | 8/2011 | Horvat et al. | 370/337 |
| 8,185,191 | B1* | 5/2012 | Shapiro et al. | 600/521 |
| 8,489,344 | B2* | 7/2013 | Baran et al. | 702/57 |
| 2002/0039888 | A1 | 4/2002 | Hama | |
| 2007/0280332 | A1* | 12/2007 | Srikanteswara et al. | 375/130 |
| 2009/0233554 | A1* | 9/2009 | Cordeiro et al. | 455/63.1 |
| 2012/0164950 | A1* | 6/2012 | Nentwig | 455/63.1 |
| 2013/0136013 | A1* | 5/2013 | Kneckt et al. | 370/252 |
| 2014/0067828 | A1* | 3/2014 | Archibong et al. | 707/748 |
| 2014/0260459 | A1* | 9/2014 | Nguyen et al. | 70/431 |

OTHER PUBLICATIONS

Taher, Tanim et al.,"Microwave Oven Interference Mitigation for Wi-Fi communication systems", IEEE CCNC 2008, Las Vegas, NV, Jan. 2008.
Taher, Tanim et al.,"Microwave Oven Signal Interference Mitigation for Wi-Fi Communication Systems", Military Communications Conference (MILCOM), Orlando FL, 2007.

\* cited by examiner

*Primary Examiner* — Steven H Nguyen
*Assistant Examiner* — Lan Huong Truong
(74) *Attorney, Agent, or Firm* — Morris & Kamlay LLP

(57) ABSTRACT

Disclosed are a system, device and method for avoiding interference with data communications from an interference source. A system may include a power consumption indication device and a network access point or client computer. The power consumption indication device may include a receptacle, a power detector and a transceiver. The receptacle may be configured to be connectable to an interference source via an electrical plug. The interference source may be a microwave or other similar device that emits radio frequency energy that may interfere with data communications. The power consumption device may generate an interference warning notification signal that may be received by a processor in either the network access point or client computer. The network access point or client computer may execute a process to detect the interference and schedule data communications to avoid the interference.

12 Claims, 3 Drawing Sheets

SYSTEM AND METHOD FOR AVOIDING INTERFERING SIGNALS

BACKGROUND

Wireless communication networks are susceptible to interference from electrical signals from devices both near and not so near to the wireless network access point. The interference may prevent data packets from being efficiently exchanged, if at all, between the access point and devices connected to the network. Systems have been developed that detect interfering signals using signal processing techniques and take appropriate action to avoid or minimize the interference.

However, the systems must constantly monitor for interfering signals. As a result, the systems must always use additional power and processor resources to constantly monitor for the interfering signals.

BRIEF SUMMARY

According to an implementation of the disclosed subject matter, a process may include receiving an interference warning signal providing notification of potential interference by a processor. A characteristic pattern of signals having a potential to interfere with communication signals to at least one controllable device in a network may be recognized. A future pattern of potential communication signal interference may be inferred from the recognized characteristic pattern. The transmission of data signals may be scheduled during a data scheduling window in response to the inferred pattern of potential interference. Scheduling signals may be transmitted to each of the controllable devices in the network. The scheduling signals may identify a respective data scheduling window.

According to an implementation of the disclosed subject matter, a device including a transceiver, a data storage and a processor communicatively coupled to the transceiver and the data storage. The processor may be configured to receive an interference warning notification signal providing notification of potential interference. A characteristic pattern of signals having a potential to interfere with communication signals to at least one controllable device in a network may be recognized by the processor. A future pattern of potential communication signal interference may be inferred from the recognized characteristic pattern. The transmission of data signals may be scheduled during a data scheduling window in response to the inferred pattern of potential interference. Scheduling signals may be transmitted to each of the controllable devices in the network. The scheduling signals may identify a respective data scheduling window.

Yet another implementation of the presently disclosed subject matter may provide a system for avoiding signals that may interfere with data communications of the system. The system may include an outlet and a network access point. The outlet may include an electrical plug receptacle, a power detector and a transceiver. The power detector may be configured to detect the delivery of electrical power to a potential source of interference. The transceiver may be configured to transmit signals output from the power detector. The network access point may include a processor and a network access transceiver configured to receive the interference warning notification signals transmitted by the outlet. The network access point processor may be configured to receive an interference warning signal providing notification of potential interference. The processor may recognize a characteristic pattern of signals having a potential to interfere with communication signals to at least one controllable device in a network. The processor may infer a future pattern of potential communication signal interference from the recognized characteristic pattern. The transmission of data signals may be scheduled during a data scheduling window in response to the inferred pattern of potential interference. Scheduling signals may be transmitted to each of the controllable devices in the network. The scheduling signals may identify a respective data scheduling window during which the respective controllable device is scheduled to transmit.

Additional features, advantages, and implementations of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Implementations of the disclosed subject matter may provide systems and techniques to mitigate interference in wireless networks by determining that there is a potential for interference at a future time. In some implementations, the determination may be made using a warning signal that indicates a potential interference. For example, an outlet or other electrical component may identify a potential source or type of interference, and provide for a warning signal to be sent to one or more components in a wireless network. Upon receiving such a signal, communication within the wireless network may be scheduled to avoid the interference. Advantageously, the described implementations provide a warning of potential interference so the wireless network may anticipate the interference and respond appropriately. Furthermore, the described implementations conserve power and processing resources until needed.

Figure 1:
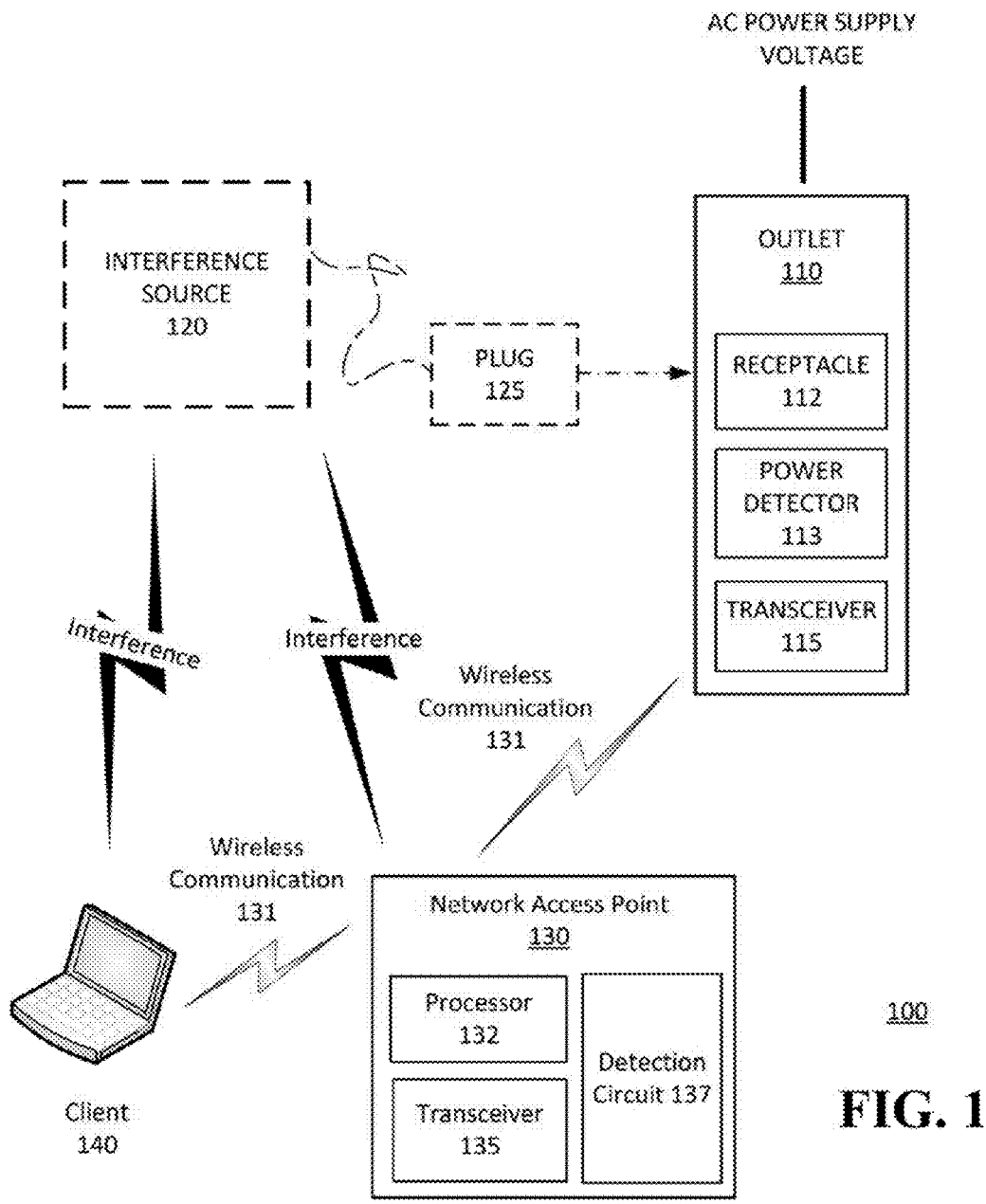
FIG. 1 shows a system configuration according to an implementation of the disclosed subject matter.

FIG. 1 illustrates a system configuration according to an implementation of the disclosed subject matter. A system 100 may facilitate avoiding interference of data communication signals by an interference source. An interference source may be a microwave oven, a cordless telephone, certain types of baby monitors, Bluetooth devices or the like. For example, microwave ovens operate in the same 2.4 GHz-2.5 GHz band as residential and commercial Wi-Fi (i.e., 802.11) networks. Other devices may operate in the same frequency band as Wi-Fi or in the ISM radio bands. The system 100 may include an outlet 110, a network access point 130 and a client 140.

The power consumption indication device 110 may include connections points for receiving alternating current (AC) electrical power (not shown), a receptacle 112, a power detector 113, and a transceiver 115. Of course, the power consumption indication device 110 may be an electrical outlet or receptacle, a circuit breaker, light switch, a pass-through device connected between a receptacle and an interference source, a component of the interference source, or any other device that may provide power to an interference source. For ease of discussion, the power consumption indication device 110 will be referred to as an outlet during the following discussion. The outlet 110 may communicate via the transceiver 115 with the network access point 130 over a wireless communications channel 131. The receptacle 112 may have contact points (not shown) connected to an AC electrical supply. The receptacle's 112 contact points may be configured to receive an electrical plug 125 connected to an interference source 120 and delivering power to the interference source 120. The contact points of the receptacle 112 may be pre-configured to receive a particular plug configuration, such as a two pronged, three pronged, or four pronged plugs inserted into it. For example, the receptacle 112 may be preconfigured to receive a three pronged plug. The outlet 110 may determine that power is being supplied to the interference source using a power detector 113.

The power detector 113 may include electrical components or a processor configured as at least one of a current sensor, a voltage sensor, and an electrical phase detector. Each of the different sensors may detect a different characteristic, e.g., current level, phase of the voltage, the voltage, and/or changes to each, of the electrical power signal delivered to the interference source 120. For example, the interference source 120 may require minimal power to operate a clock on a display panel or a light in the device. In operation, the interference source may use substantially more power. The interference source 120 may generate during operation radio frequency signals in a broad or narrow frequency band and with a particular duty cycle. The power detector 113 may be further configured to detect the increase in power usage, or other electrical power characteristic (e.g., current), due to the operation of the interference source 120. The power detector 113 may be coupled either in series or in parallel to the receptacle 112 to detect the supply of AC power to the interference source 120. The power detector 113 may deliver a signal to the transceiver 115 indicating that power is being delivered to the interference source 120. The transceiver 115 may be configured to transmit and receive radio frequency signals in a frequency range and operate according to a communication protocol suitable for the network access point 130.

The network access point 130 may also include a processor 132 and a network access point transceiver 135. The transceiver 135 may be configured to communicate with at least one outlet 110. The transceiver 135 may be further configured to receive the interference warning signal transmitted by the outlet 110. The processor 132 may be configured to receive an interference warning signals from the transceiver 135. The processor 132 may include interference detection circuitry or have access to circuitry external to the processor that may be activated in response to the processor receiving the interference warning signal. When activated the interference detection circuit may begin detecting signals that may interfere with data communication signals in the frequency range of the network access point 130. The circuitry may be configured to detect the interference patterns, for example, by directly monitoring signals in the frequency band and duty cycle of the interference source, or detecting symptoms of interference, such as not receiving data frames for a time period, as an indication that there is active interference during that time period, and then to detect the periodic nature of such interference. More detailed symptoms such as not receiving any frames from a particular transmitter during a repeated period may also be used. Alternatively, the interference detection circuitry may use spectrum indications such as a peak width of the received signal as an indicator of interference. In addition, some sources of interference, such as specific brands of microwave ovens, may have fairly pronounced signal amplitude peaks in the 5 to 10 MHz range, for example.

The client 140 may be a laptop computer, desktop computer, television, audio system or similar device that may communicate any suitable frequency range, for example in the IEEE 802.11a, b, g, n (Wi-Fi) or similar frequency ranges. Alternatively, a device connectable to the client (not shown) via, for example, a USB connector or other connector may include the disclosed electronic components. The interference may also affect the data signals transmitted to or by the client 140. The client 140 may be configured in a similar manner as the wireless access point 130. For example, the client 140 may include a processor and interference detection circuitry similar the processor 132 and detection circuitry 137. Of course, there may be more than one client 140 as well as more than one wireless access point 130. The system 100, and, in particular, the client 140 processor or the wireless access point processor 132 may respond to interference warning notification signal by executing a process such as the process described with respect to FIG. 2.

Figure 2:
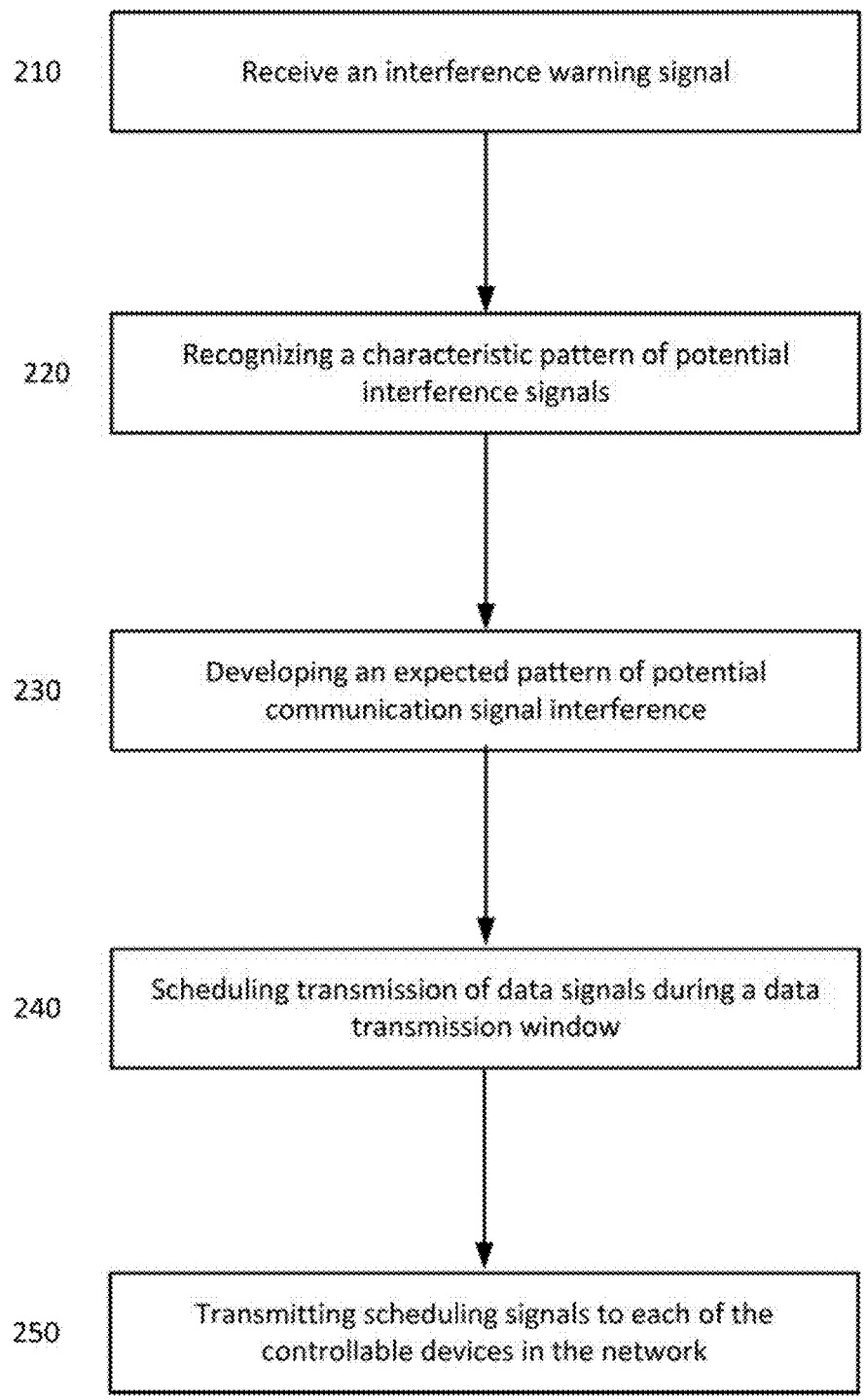
FIG. 2 shows a flowchart of a process according to an implementation of the disclosed subject matter.

FIG. 2 illustrates a method according to an implementation of the presently disclosed subject matter. The described method 200 may provide a process for avoiding interference generated by an interference source of data communication signals. The process may be implemented by a wireless access point or a similar device, such as a home network controller. At step 210, a processor may receive an interference warning signal from a transceiver. The interference warning signal may be generated by a power consumption indicating device, such as outlet 110, related to the interference source. The interference source may begin generating potentially interfering signals. A signal pattern that may be characteristic of the potential interfering signals may be recognized. For example, the interfering signal pattern may be periodic around the frequency range of the wireless access point. Alternatively, the recognition may include identifying a series of time periods in which expected data frames are not received. For example, microwave ovens may have pulsed operation with the pulse rate being 60 Hz (one pulse per incoming AC cycle) or 120 Hz (one pulse per half-AC-cycle) and with a duty cycle typically between 30% and 80%. The pattern of potential interfering signals may be recognized by identifying a series of time periods in which expected data frames are not received, or, in other words, repeated instances of actual interference with the data communication signals. Of course, other techniques may also be used. The potentially interfering signals may interfere with communication between a wireless access point and at least one controllable device or between two controllable devices in a network or a combination of devices and access points (220). At step 230, an expected pattern of potential communication signal interference may be developed by the processor. In response to the expected pattern of potential communication signal interference, a schedule for transmitting data may be determined and represented by scheduling signals (240). The scheduling signals may be transmitted to each of the controllable devices in the network at 250. The scheduling signals may identify a respective data scheduling window during which the respective controllable device is scheduled to transmit data signals to avoid the interference. Alternatively, the scheduling signals may represent a data communication avoidance window. Different algorithms may be used to determine the data scheduling window. For example, the scheduling signals may instruct the wireless access point or client device to use an 802.11-type RTS (request to send) and/or CTS (clear to send) frames to instruct the controllable devices, or even other clients, in the network that the "transmission medium" (e.g., the air) will be radio-busy during each determined microwave pulse. The scheduling signal may indicate a data transmission avoidance window. Alternatively, based on the timing of the microwave pulses, the wireless access point or client may identify an optimum position in time to transmit a transmission timing signal, which may be considered a data communication transmission window. For example, an end of interference period signal may be sent immediately after an interfering pulse completes. The transmission timing signal may be sent every 100 ms, and may align with every 6 (or 12) pulses. However, the transmission timing signal may be skewed and may to have a rate change to more closely match the interfering pulses. As a result, the controllable device or other client devices may not attempt transmission during the interfering pulse and to also not expect reliable reception of data signals. In addition to the scheduled data communication windows, the controllable device or other client may also use enhanced error detection and/or error correction to compensate for the expected interference.

The transmission timing signal may identify a recommended data communication transmission window for the specific controllable device. The recommended data communication transmission window may be a time period during which the controllable device is allowed to transmit data. The data scheduling window may be a data communication transmission window that is a time period during which specific devices are instructed, or scheduled, to communicate. A specific controllable device may output a request-to-send (RTS) or similar signal preceding a set data scheduling window.

Alternatively, the timing signal may identify a recommended data communication avoidance window for the specific controllable device. In this case, the recommended data communication avoidance window may be a time period during which the controllable device remains silent or are instructed to avoid attempting to communicate. In this case, a specific controllable device may receive a clear-to-send (CTS) signal preceding the termination of a scheduled data communication avoidance window. For example, a client computer that detects the interference may transmit data according to a determined schedule to avoid interference.

Another avoidance method may use a "transmission signal" from the access point that determines the scheduling of communications. Typically, the access point may periodically, e.g., every 100 ms, broadcast a polling signal. However, controllable devices and clients are not intended to follow the polling signals issued by the access point because the access point may randomly shift the polling signal. The polling signal may be used for a number of things. For example, it may inform devices connected to the access point that the access point is present and active, or may inform connected devices that there is data for them that are available for delivery by the access point. However, Wi-Fi is not a completely scheduled transmission communication protocol. If the access point knows the polling signal is aligned with interference, such as when the polling signal is regularly output just before or during interference, the connected devices may transmit at the wrong time. Accordingly, active polling management as disclosed herein provides a polling signal at the correct times to facilitate communication during periods of minimal or no interference. Some communication protocols, such as 802.15.4 standard communications, have a formalized beacon that is more important for scheduling transmissions. The formalized beacon may be more easily utilized for active polling management.

Figure 3:
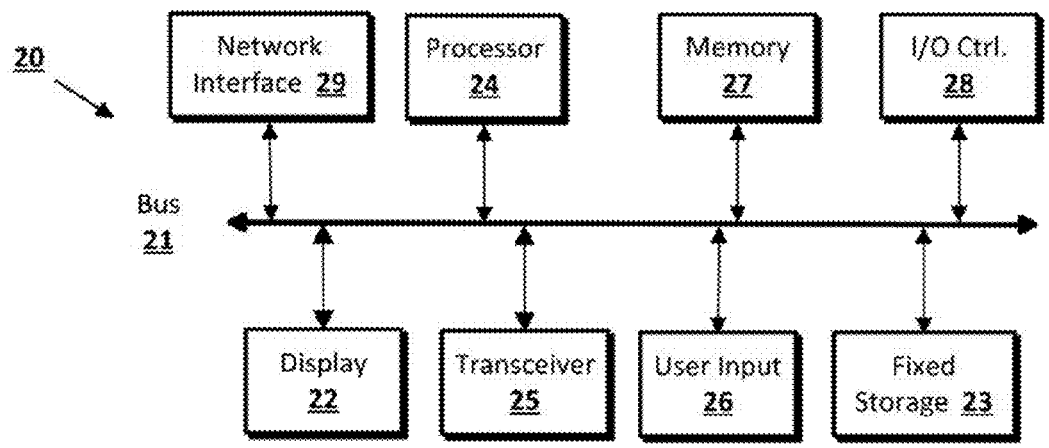
FIG. 3 shows a device according to an implementation of the disclosed subject matter.

Implementations of the presently disclosed subject matter may be implemented in and used with a variety of component and network architectures. FIG. 3 is an example device 20 suitable for implementations of the presently disclosed subject matter. The device 20 may be a network access point or a client computer that may implement the process described in FIG. 2. The device 20 may include a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a transceiver 25 operative to send and receive control and data signals.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or the like.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via known technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

The processor 24 may be communicatively coupled to the transceiver 25, and may be configured to receive an interference warning signal generated by a power. The processor 24 may include circuitry or have access to circuitry that may detect and/or recognize a characteristic pattern of signals having a potential to interfere with communication signals to at least one controllable device in a network. Based on the recognized characteristic pattern, the processor 24 may infer or develop a future pattern of potential communication signal interference. The processor 24 may schedule transmission of data signals during a data scheduling window in response to the inferred pattern of potential interference. Scheduling signals may be sent by the processor 24 for transmission to each of the controllable devices in the network. The scheduling signals may identify a respective scheduled data scheduling window during which the respective controllable device is scheduled to transmit.

The transceiver 25 may be configured to receive the interference warning signal from a source of interference and deliver the interference warning signal to the processor. Alternatively, the transceiver 25 may be configured to receive the interference warning signal from an electrical receptacle plug and deliver the interference warning signal to the processor 24.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, or on a remote storage location.

Figure 4:
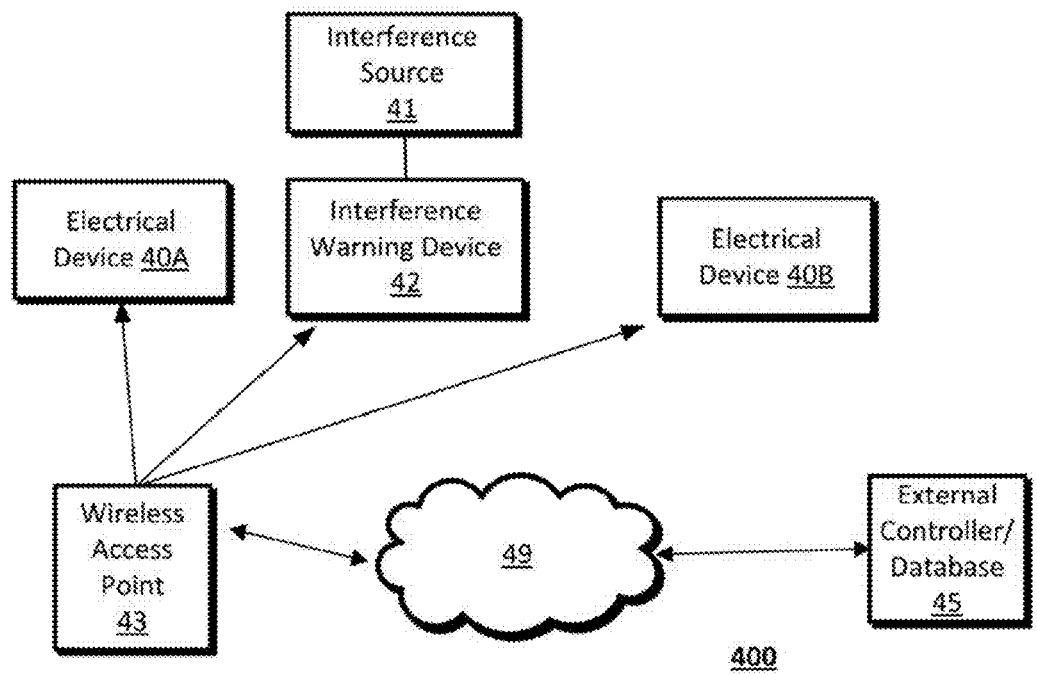
FIG. 4 shows a network implementation according to an implementation of the disclosed subject matter.

FIG. 4 shows an example network arrangement according to an implementation of the disclosed subject matter. The network 400 may include one or more interference warning devices 42 and electrical devices 40A, 40B, such as local computers, smart phones, tablet computing devices, and the like, which may connect to other devices via one or more wireless network access points 43. The interference warning device 42 may be connected to an interference source 41. The network 400 may be a local network, wide-area network, the Internet, or any other suitable communication network or networks, and may be implemented on any suitable platform including wired and/or wireless networks. The interference warning devices and electrical devices 40A and 40B may be considered clients. The clients 40A, 40B and 42 may communicate with one or more wireless network access points 43. The network access point 43 may have access to a network 49, such as the internet. The network 49 may have access to external controllers or databases 45 or services provided by external controllers 45 such as cloud computing arrangements and services. The external controllers or databases 45 may include one or more servers and/or databases. For sake of explanation, only a limited number of electrical devices, interference warning devices, and interference sources are shown. However, more or less electrical devices, interference warning devices and interference sources may be included in the network 400.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method, comprising:
receiving, by a processor, an interference warning notification signal generated based on detection of an increase in power usage of an interference source by a power detector of a power consumption indication device, wherein the power consumption indication device is an electrical outlet or receptacle through which the interference source is powered, and wherein detection of an increase in power usage is based on a detection of an increase in current delivered to the interference source through the electrical outlet or receptacle;
recognizing a characteristic pattern of signals having a potential to interfere with communication signals to at least one controllable device in a network;
inferring a future pattern of potential communication signal interference;
scheduling transmission of data signals during a data scheduling window in response to the inferred pattern of potential interference; and
transmitting scheduling signals to each of the controllable devices in the network, the scheduling signals identifying a respective data scheduling window.

2. The method of claim 1, wherein the data scheduling window is a data communication transmission window that is a time period during which specific devices are instructed to communicate.

3. The method of claim 1, wherein the data scheduling window is a data communication avoidance window that is a time period during which specific devices are instructed to avoid attempting to communicate.

4. The method of claim 1, further comprising:
receiving a request-to-send signal from a specific controllable device preceding the data scheduling window, wherein the data scheduling window is a data communication window that is a time period during which specific devices that are prepared to communicate are instructed to communicate.

5. The method of claim 1, further comprising:
receiving a clear-to-send signal preceding the termination of a scheduled data communication avoidance window.

6. The method of claim 1, wherein the recognizing comprises:
identifying a series of time periods in which expected data frames are not received.

7. A device, comprising:
a transceiver;
a data storage;
a processor communicatively coupled to the transceiver and the data storage, the processor configured to:
receive an interference warning notification signal from the transceiver, wherein the interference warning notification signal is generated based on detection of an increase in power usage of an interference source by a power detector of a power consumption indication device, wherein the power consumption indication device is an electrical outlet or receptacle through which the interference source is powered, and wherein detection of an increase in power usage is based on a detection of an increase in current delivered to the interference source through the electrical outlet or receptacle;
recognize a characteristic pattern of signals having a potential to interfere with communication signals to at least one controllable device in a network;
infer a future pattern of potential communication signal interference;
schedule transmission of data signals during a data scheduling window in response to the inferred pattern of potential interference; and
transmit scheduling signals to each of the controllable devices in the network, the scheduling signals identifying a respective data scheduling window.

8. The device of claim 7, wherein the transceiver is configured to receive the interference warning signal from an electrical receptacle plug and deliver the interference warning signal to the processor.

9. The device of claim 7, wherein the transceiver is configured to receive the interference warning signal from the power consumption indication device and deliver the interference warning signal to the processor.

10. A system, comprising:
a receptacle including a power detector and a transceiver, the transceiver configured to transmit signals output from the power detector;
a network access point including a processor and a network access transceiver configured to receive the signals transmitted by the receptacle;
wherein the processor in the network access point is configured to:
receive a potential interference warning signal from the receptacle, wherein the interference warning notification signal is generated based on detection by the power detector of an increase in power usage of an interference source powered through the receptacle, and wherein detection of an increase in power usage is based on a detection of an increase in current delivered to the interference source through receptacle;
identify a signal pattern of interference;
formulate a signaling regimen for a controllable device to transmit data; and
deliver a timing signal to the controllable device providing the signaling regimen to the controllable device.

11. The system of claim 10, wherein the timing signal identifies a recommended transmission window for the specific controllable device, the recommended transmission window being a time period during which the controllable device is allowed to transmit data.

12. The system of claim 10, wherein the timing signal identifies a recommended avoidance window for the specific controllable device, the recommended avoidance window being a time period during which the controllable device remains silent.

* * * * *